Oct. 24, 1950     C. F. ROBBINS     2,526,901
ELECTRICAL CONTROL STATION
Filed Aug. 16, 1946     3 Sheets-Sheet 3
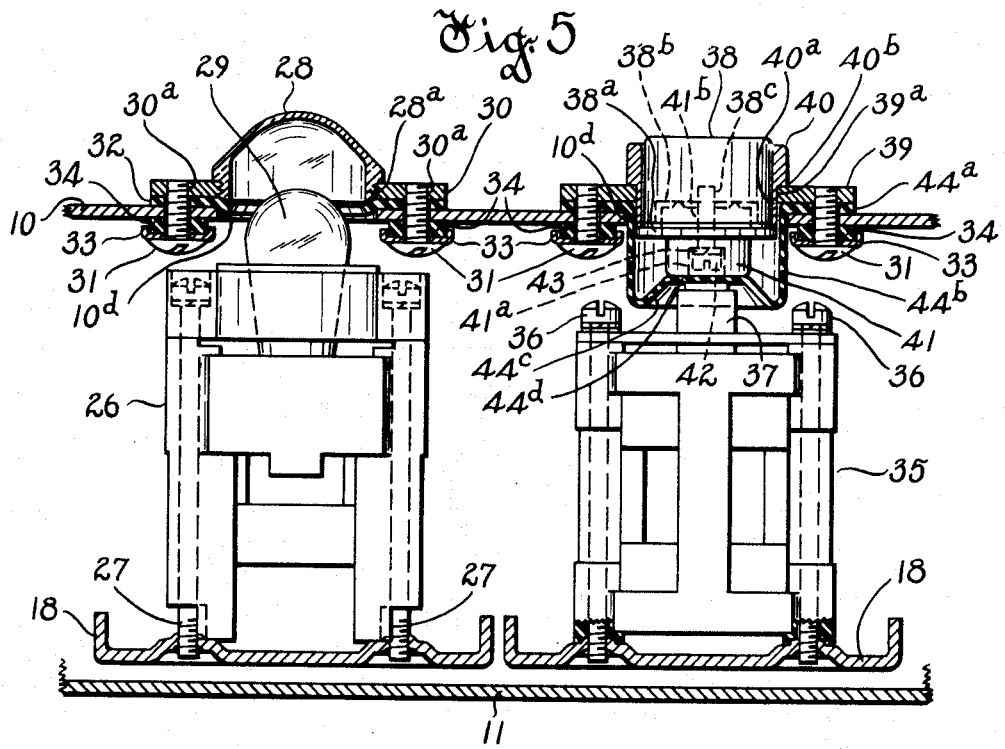
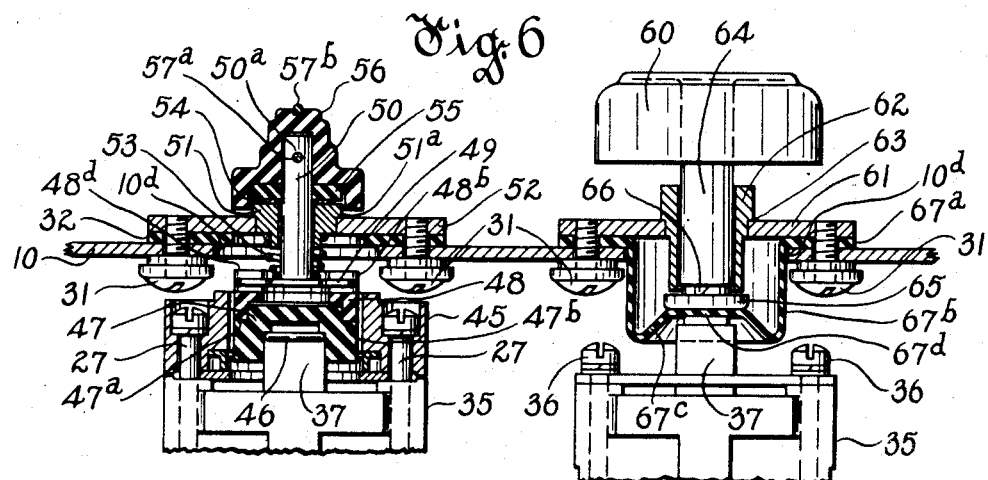
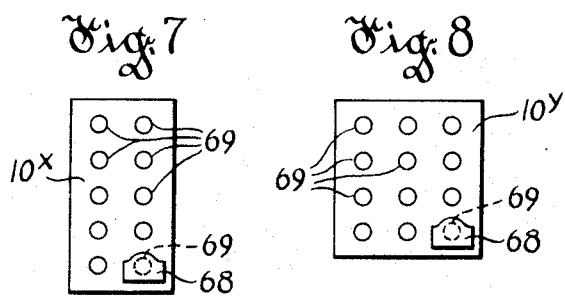

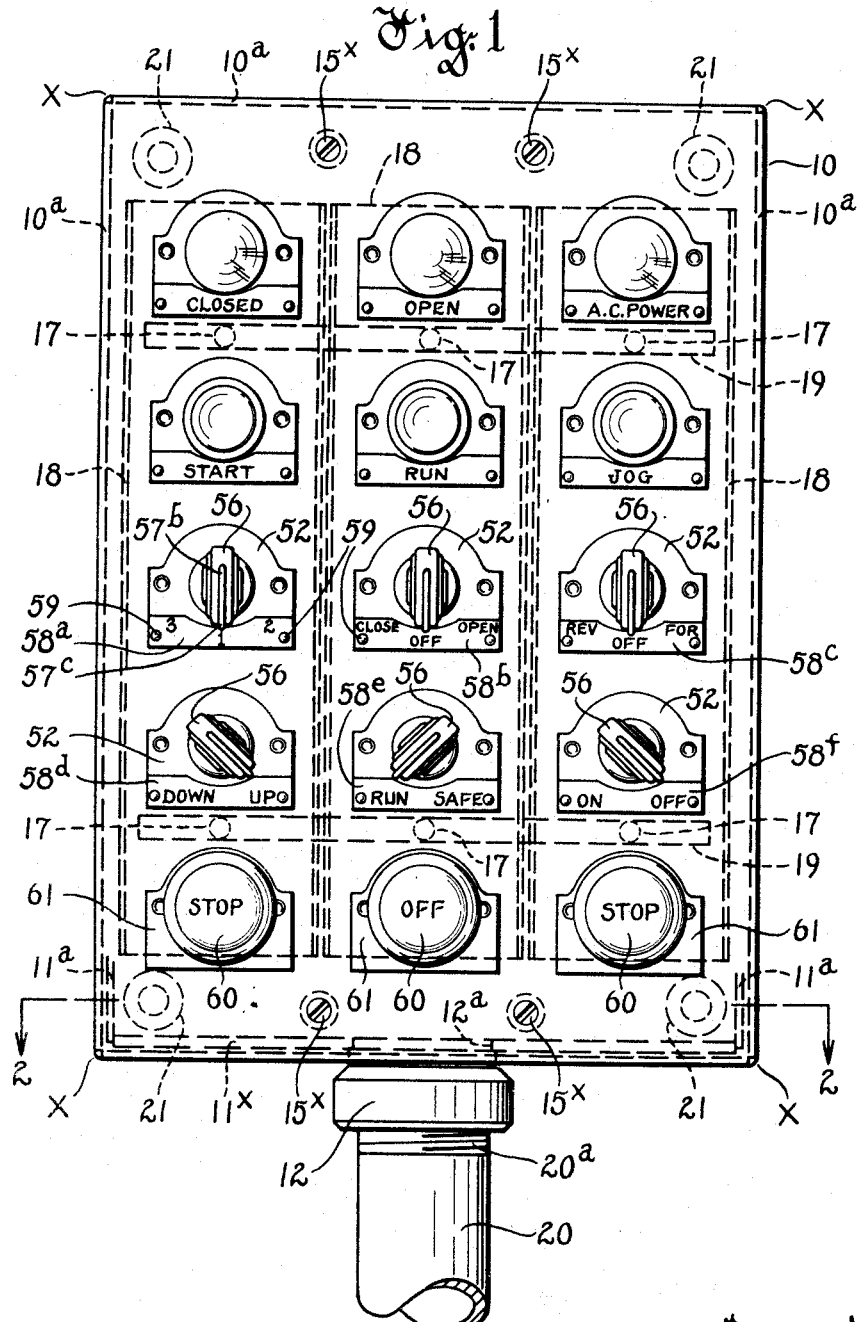

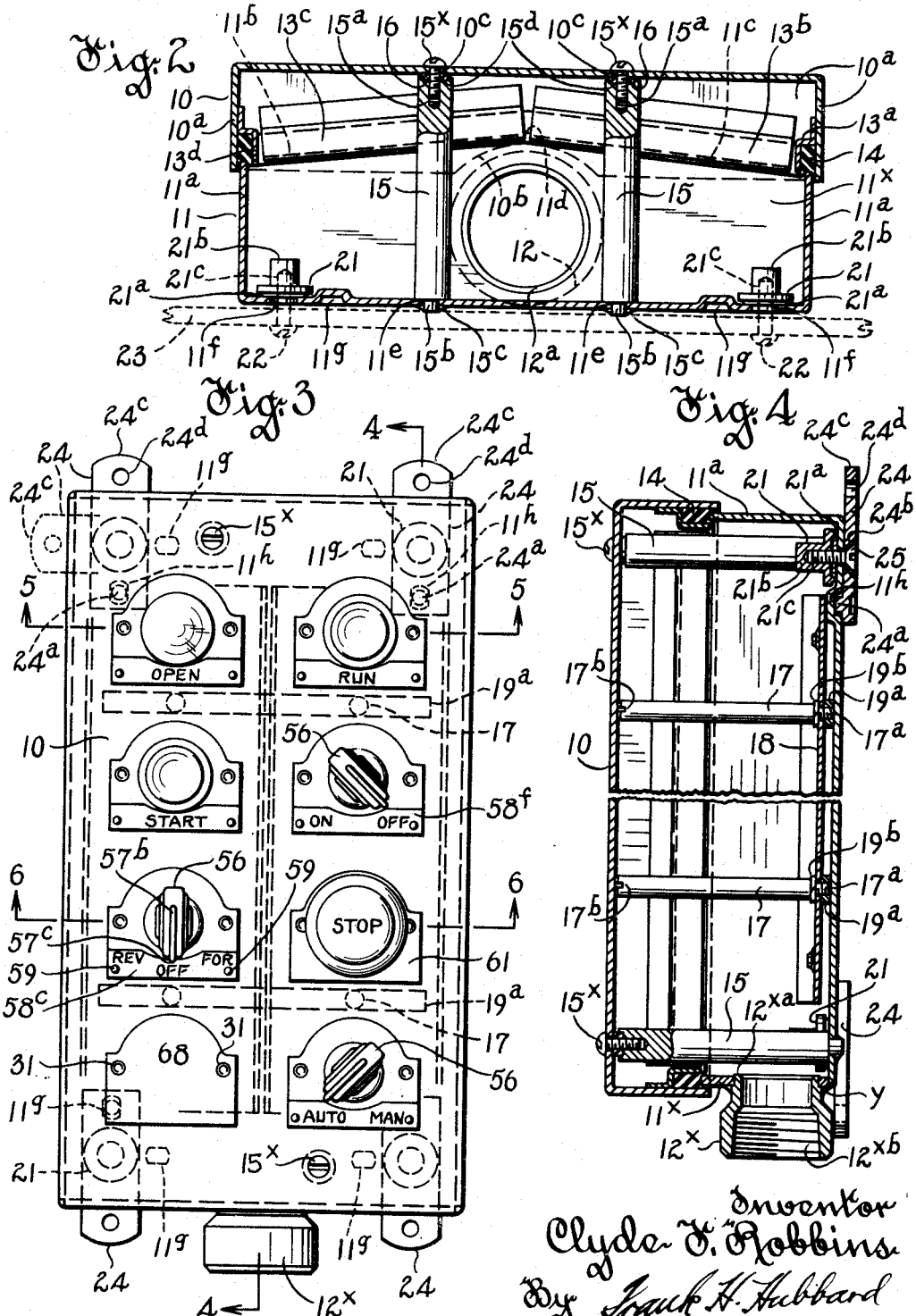

Patented Oct. 24, 1950

2,526,901

UNITED STATES PATENT OFFICE 2,526,901

ELECTRICAL CONTROL STATION

Clyde F. Robbins, Milwaukee, Wis., assignor to Cutler-Hammer, Inc., Milwaukee, Wis., a corporation of Delaware Application August 16, 1946, Serial No. 690,991

10 Claims. (Cl. 175—307)

This invention relates to improvements in electrical control stations, and more particularly to improvements in oil-tight electrical pushbutton control stations adapted for use in machine tools.

An object of the invention is to improve and simplify the details of construction and assembly of electrical control stations of the character aforementioned.

Another and more specific object of the invention is to provide machine tool type electrical control stations which are oil-tight.

Another object of the invention is to provide for use of sheet metal casing parts in the construction of electrical control stations of the aforementioned character.

Another object is to minimize the number of different sizes of sheet metal casings required to house a large range in number of electrical control units.

Another object is to provide a sheet metal oil-tight housing with alternative means for supporting or attaching the same with respect to a machine tool, without affecting the oil-tightness of said housing.

Another object is to provide an oil-tight station of the aforementioned character wherein the switch portions are supported entirely by the base portion of the housing, and the respective operating means therefor are carried by the cover member, in oil-tight relationship to the latter.

Another object is to provide novel means to afford an oil-tight telescopic connection between the base member and cover member of the housing.

Another object is to provide novel means to retain the base and cover members in assembled relation without affecting the oil-tightness of the assembly.

Another object is to provide novel and simple means to insure proper spacing and parallelism of the opposed walls of the base and cover members when in assembled position.

Other objects and advantages of the invention will hereinafter appear.

The accompanying drawings illustrate certain preferred embodiments of my invention, it being understood that the embodiments illustrated may be modified in respect of certain details of construction and arrangement of the parts without departing from the scope of my invention as defined in the appended claims.

In the drawings, Figure 1 is a plan view of an oil-tight electrical control station constructed in accordance with my invention; the same being shown as adapted to house twelve control switch units and three indicating light units, in a manner to provide for oil-tightness of the station as a whole; the same being adapted for support by the wiring conduit.

Fig. 2 is a sectional view on the line 2—2 of Fig. 1, illustrating the manner in which the combined wiring conduit and support is accommodated by the base and cover portions of the housing, and the manner in which the base and cover members of the housing are secured to each other; alternative means being shown to provide for attachment of the housing to a panel or similar support.

Fig. 3 is a plan view of a control station adapted to accommodate up to eight control units of the character aforementioned.

Fig. 4 is a fragmentary longitudinal sectional view on the broken line 4—4 of Fig. 3 showing certain details of the housing assembly; but with the control units omitted, for purposes of illustration; and illustrating the means by which parallelism of the opposed walls of the base and cover members of the housing is insured.

Fig. 5 is a sectional view on line 5—5 of Fig. 3 showing and indicating light and a pushbutton switch located within the housing, and the manner in which oil-tightness of the latter is maintained.

Fig. 6 is a sectional view on the line 6—6 of Fig. 3, fragmentarily illustrating a so-called selector type switch and a switch having a mushroom type of operating element, and illustrating the manner in which an oil-tight connection is provided between the respective operating elements and the cover member of the housing.

Fig. 7 diagrammatically illustrates an oil-tight control station of the character herein contemplated, but of a size to accommodate a maximum of ten indicating light and/or switch units of the aforementioned types, and Fig. 8 similarly illustrates an oil-tight control station to accommodate a maximum of twelve of such units.

In respect of machine tool control stations there has long been a demand for: (a) an arrangement providing for oil-tight base mounting of the control units in conjunction with separately supported oil-tight operators having other than a so-called one-hole type of mounting; (b) mounting of such oil-tight operators upon the cover member to provide for removal of the operators jointly with the cover member with-out affecting the positioning of the main body portions of the control units; and (c) oil-tight control stations of the aforementioned character comprising base and cover members fabricated from sheet metal. My invention meets all of these demands; whereas oil-tight stations as heretofore proposed for this purpose have either required one-hole mounting of the respective control units, or the use of housings of heavy and expensive types, composed either of metal castings or of molded insulation base and cover members.

Referring first to Figs. 1 and 2, the numeral 10 designates a one-piece inverted box-like sheet metal cover member, and the numeral 11 (Fig. 2) designates a box-like sheet metal base member. The respective sheet metal blanks are bent to provide integral side and end walls, the adjacent edge portions of which are provided with continuously welded or brazed lines, indicated at points marked X in Fig. 1, to form oil-tight connections therebetween.

After such welding or brazing operation said corners are preferably ground or otherwise dressed smooth. The side and end walls of cover member 10 are designated by the numeral $10^a$ (Fig. 2); the two integral side walls and one end wall of base member 11 being designated by numeral $11^a$ in Figs. 1 and 2, and the relatively thicker other end wall of said base member being designated by numeral $11^x$. The aforementioned end wall $11^x$ is welded or brazed throughout its length to the bottom wall of base member 11, and throughout its height to the adjacent ends of side walls $11^a$ of said member. The peripheral walls $10^a$ are adapted to telescope downwardly over the peripheral walls $11^a$ and $11^x$ of member 11. One of the end walls of member 10 is provided at the mid-portion thereof with an arcuate notch or cut-away portion as shown in dotted line at $10^b$ in Fig. 2 to accommodate or provide clearance for a hollow metal bushing 12 the reduced end $12^a$ of which is adapted to fit snugly within a circular opening provided in the corresponding end wall $11^x$ of member 11; the periphery of said bushing adjacent the outer surface of said end wall $11^x$ being provided with a continuous line of welding or brazing material to form an oil-tight connection between these parts (such a connection being best illustrated at Y in respect of the relatively smaller bushing $12^x$ in Fig. 4).

The peripheral wall portions $10^a$ of member 10 have attached thereto adjacent the lower ends thereof, as by spot-welding, a plurality of sheet metal bars or strips $13^a$, $13^b$, $13^c$, $13^d$, etc. which are of substantially Z-form in transverse cross section, whereby downwardly opening channel portions are provided. Into these channel portions a one-piece strip 14, of rubber or rubber-like material, is forcibly inserted in the manner best illustrated in Fig. 2.

That end wall $11^x$ of member 11 to which the bushing 12 is attached has edge portions $11^b$ and $11^c$ converging at the mid-point thereof as shown at $11^d$. Accordingly the aforementioned Z-bars $13^b$ and $13^c$ on the inner surface of the corresponding end wall $10^a$ of member 10 are angled as shown in Fig. 2 to provide for proper positioning of said oil-tight gasket 14. The channel-forming metal bars $13^a$, $13^d$, etc. upon the side walls and the other end wall of cover member 10 are arranged in a horizontal position.

With the arrangement illustrated the cover member 10 when telescoped onto base member 11 provides for seating of gasket 14 against the peripheral upper edge of the side and end walls $11^a$, $11^x$ of member 11. Cover member 10 is adapted to be removably attached in assembled relation to base member 11 as by means of a plurality of securing screws $15^x$, four of which are employed in a control station of the size shown in Figs. 1 and 2; cover member 10 having a corresponding number of relatively small circular openings formed therein to accommodate the shanks of screws $15^x$. Said shanks of screws $15^x$ take into tapped openings $15^a$ in the upper ends of a corresponding number of substantially cylindrical metal studs 15; the latter having reduced lower end portions $15^b$ which penetrate openings $11^e$ of substantially corresponding size in the bottom wall of base member 11 (Fig. 2); said portions $15^b$ extending slightly beyond the outer surface of said bottom wall and the same being provided with continuous lines of welding or brazing material $15^c$, to provide for rigid and oil-tight attachment of studs 15 to base member 11. The studs 15 are respectively provided at the upper ends thereof with relatively shallow cylindrical countersinks or recesses $15^d$ within which the rubber or rubber-like washers or gaskets 16 are seated to insure oil-tightness of the top wall of member 10 when screws $15^x$ have been tightened to final position.

To insure proper spacing and parallelism of the top wall of member 10 with respect to the bottom wall of member 11 I prefer to provide a plurality of long-headed screws or bolts, six of which are shown in dotted lines at 17 in Fig. 1; the form of said bolts 17 being best illustrated in Fig. 4. The threaded shanks $17^a$ of bolts 17 are adapted to penetrate alined openings in the upwardly opening channel-shaped members, three of which are shown in dotted lines at 18 in Fig. 1, and said shanks take into tapped openings provided in relatively thick metal strips 19 secured to and extending transversely of the inner surface of the bottom wall of member 11; functionally corresponding but relatively shorter bars being shown at $19^a$ in Figs. 3 and 4. Also as shown in Fig. 4 the lock washer $19^b$ is interposed between the head portion of each bolt 17 and the upper surface of the aforementioned channel members 18. The upper end of each bolt head is kerfed as shown at $17^b$ in Fig. 4, to provide for tightening thereof, as by means of a screw driver. The channel members 18 (Fig. 1) are thus retained in assembled relationship to the bottom wall of base member 11 and the bolts 17 when tightened have their upper end surfaces arranged in a common plane; said surfaces or ends of bolts 17 acting in an obvious manner to insure parallelism and proper spacing of the top wall of member 10 with respect to the bottom wall of member 11.

The aforementioned bushing 12 is internally threaded (see $12^{xb}$ in Fig. 4) to accommodate the threaded end portion $20^a$ of a metal wiring conduit 20 (Fig. 1). Because of the aforedescribed manner of rigidly and permanently attaching bushing 22 to the relatively thick end wall $11^x$ of base member 11, and in view of the relatively large caliber or size of conduit 20, the latter may be additionally utilized for mechanically supporting the control station as a whole; oil-tightness of both the housing and the supporting means being insured.

As shown in dotted lines at 21 in Fig. 1, and in full lines in Fig. 2 a plurality of machined metal members are adapted to overlie a corresponding number of circular openings adjacent the four corners of the bottom wall of member 11. Members 21 are respectively provided at their lower faces with annular rib portions $21^a$ which are welded or fused to the inner surface of said bottom wall, to provide an oil-tight connection between these parts. Members 21 are further provided with upwardly projecting cylindrical extensions 21$^b$ of reduced diameter, and each is provided with a drilled and tapered recess 21$^c$ (Fig. 2); which tapped recesses may be utilized to accommodate the shanks of a corresponding number of bolts or screws, the heads of which are shown in dotted lines at 22 in Fig. 2 to provide for rear mounting or attachment of the housing (members 10 and 11) as a unit to a panel or similar support shown in dotted lines at 23.

The outer surface of the bottom wall of member 11 is provided adjacent each opening 11$^f$ with a corresponding number of upwardly pressed or stamped portions forming straight grooves 11$^g$ (Fig. 2), and a corresponding number of similar grooves 11$^h$ (Fig. 4) are formed in member 11 and arranged at substantially right angles to grooves 11$^g$.

Said grooves 11$^g$ and 11$^h$ are adapted for selective cooperation with upwardly extruded circular studs or bosses 24$^a$ formed upon a corresponding number of punched and stamped sheet metal feet 24 (see Figs. 3 and 4); each foot 24 having a countersunk opening formed therein to be alined with the tapped recess 21$^c$ in the respective member 21, said openings being adapted to accommodate in a flush relation the heads 25 of suitable securing screws the shanks 25$^a$ of which are adapted for cooperation with the aforementioned tapped recesses 21$^c$. Before fully tightening the screws 25, the bosses or studs 24$^a$ may be positioned in either of the respective grooves 11$^g$ or 11$^h$ to provide for upward or lateral projection of the ends 24$^c$ of foot members 24 (as best illustrated in full lines and in dotted lines at the left-hand upper end of Fig. 3). Said ends 24$^c$ are perforated as shown at 24$^d$ to accommodate the shanks of screws or bolts, or similar fastening elements (not shown) whereby the control station may be attached to a suitably prepared recess in a machine tool or the like.

As will be apparent from the foregoing description the housing or casing for the control station is rendered completely oil-tight; and in accordance with my invention the various switch units are attachable to the channel members 18, and the operating elements therefor are attachable to the cover member 10, without affecting the oil-tightness of the station as a whole.

For example, I have illustrated in Fig. 5, at the left-hand side thereof an indicating light unit the molded insulating base portion 26 of which is attached by a pair of bolts 27 to one of the channel-shaped members 18 aforementioned. Said indicating light unit is in general of the character disclosed and claimed in my Patent No. 2,339,196, granted January 11, 1944, to which reference may be had for a detailed description of the structural elements thereof. In accordance with my invention, however, the lens 28 (preferably molded of a transparent or translucent, non-vitreous plastic material) to be associated with the lamp 29 of unit 26, is adapted to be attached to the upper wall of cover member 10 in oil-tight relationship to the latter; and in a manner to provide for support of said lens 28 separately from the unit 26, whereby the lens may be removed bodily with the cover member 10.

As shown, the lens 28 has a threaded connection 28$^a$ with a sheet metal plate 30 the latter being attachable, as by means of a pair of screws 31, the shanks of which extend upwardly through clearance openings provided in cover member 10 and take into tapped openings 30$^a$ provided in plate 30. A gasket 32, of rubber or rubber-like material and of a contour substantially corresponding to that of plate 30, is interposed between the latter and the outer surface of cover member 10; said gasket having a relatively large opening 10$^d$ formed therein, as shown, to provide clearance for the upper end of the lamp bulb 29. Each screw 31 has strung upon the shank thereof a cup-shaped sheet metal washer member 33 the flange of which surrounds a perforated disk or washer 34 of rubber or rubber-like material which is interposed between member 33 and the inner surface of cover member 10. Thus upon tightening of screws 31 the gasket elements 32, 34 cooperate to provide an oil-tight connection between the cover member 10 and the supporting means for the aforementioned lens 28.

At the right-hand side of Fig. 5 I have shown a so-called heavy duty pushbutton switch mechanism of the character disclosed and claimed in my application, Serial No. 449,756, filed July 4, 1942, now Patent No. 2,460,034. Said switch mechanism comprises essentially a one-piece molded insulating base member 35 which is attachable to one of the channel-shaped members 18 as by means of a pair of bolts 36. Said switch mechanism further includes a one-piece molded insulting plunger 37 which is adapted to carry one or more bridging contactors (not shown), for cooperation with one or more pairs of stationary contacts carried by the insulating base member 35. The structural details of such a switch mechanism are described in the application aforementioned, and are not claimed herein.

The pushbutton operating element 38 of said switch mechanism is adapted to be attached in oil-tight relationship to the cover member 10. For this purpose I prefer to provide a plate 39 (which is preferably of substantially the same contour as the aforementioned plate 30); said 39 having therein a circular opening 39$^a$ which is adapted to accommodate the reduced lower end 40$^a$ of a hollow metal bushing 40, said bushing being peripherally welded or brazed to plate 39, as indicated at 40$^b$, to provide an oil-tight connection between these parts. Pushbutton 38 is provided at its lower end with an annular flange 38$^a$, the upper surface of which is adapted to abut the lower edge of reduced portion 40$^a$ to limit the degree of outward movement of the pushbutton.

Pushbutton 38 is provided in the lower end thereof with a substantially cylindrical recess, shown in dotted lines at 38$^b$ to accommodate the upper end of a separate insulating member 41, the latter having a countersunk recess 41$^a$ in the lower end thereof to accommodate the head of the bolt or screw 42, the threaded shank of which penetrates an opening through member 41 and takes into a taped recess in the upper end wall of recess 38$^b$ in pushbutton 38, as indicated in dotted lines at 38$^c$. A lock washer 43 is preferably interposed between the head of screw 42 and the upper end wall of recess 41$^a$. Interposed between the lower face of plate 39 and the outer surface of cover member 10 is a flange portion 44$^a$ of a gasket member formed of rubber or rubber-like material, said flange having formed integrally therewith the depending cylindrical portion 44$^b$, the lower end of which is reflexed or angled as shown at 44$^c$ and integrally joined with a substantially horizontal portion 44$^d$. Portion 44$^d$ as shown is interposed between the lower end of member 41 and the upper end of the aforementioned contactor-carrying plunger 37. Screws 31, cup-shaped metal members 33 and rubber or rubber-like washers 34 like those aforedescribed are provide to complete the oil-tight mounting of the push-button 39 with respect to cover member. 10.

The rubber or rubber-like material herein referred to preferably consists of material which is substantially unaffected by contact therewith of oil or grease. The synthetic rubber sold under the trade name of "Neoprene" is an example of such a material.

At the left-hand side of Fig. 6 I have shown a so-called selector switch which is in general of the character disclosed and claimed in my Patent No. 2,357,971, granted Sept. 12, 1944; to which reference may be had for a detailed description of certian of the switch parts. Thus said selector switch includes a one-piece molded insulating base 35 and a one-piece molded insulating plunger 37 like the corresponding parts shown at the right-hand side of Fig. 5; with any desired arrangement or combination of stationary contacts and movable contactors, as disclosed in said Patent 2,357,971. Base 35 has associated therewith a cast metal adapter member 45; and bolts 27 (of a length corresponding to those shown at the left-hand side of Fig. 5) have their shanks extending downwardly through member 45 and base 35 for attachment of the assembled parts to one of the aforementioned channel-shaped sheet metal members 18.

Removably but non-rotatably attached to the upper end of plunger 37, as by means of an interposed spring ring 46, is a molded insulating member 47, which is provided with a diametrically opposed pair of integral laterally extending lugs 47ª and 47ᵇ, which are adapted to be cooperatively engaged by diametrically opposed sets of downwardly facing cam surfaces formed upon the molded insulating member 48. The cam surfaces (not shown) upon member 48 may alternatively correspond with any of those shown in Figs. 8, 10 and 15 in said Patent No. 2,357,971; member 48 being mounted in telescopic or axially overlapping relationship to member 47. Member 48 is provided in its upper end with a diametrical slot or kerf, as indicated at 48ª and 48ᵇ (Fig. 6) to accommodate opposite end portions of a punched sheet metal member 49, which is swaged, riveted, or otherwise rigidly and permanently attached to the lower end of a rotatable shaft 50.

Shaft 50 is assembled by inserting the same upwardly through a bearing opening provided therefor in a metal bushing 51; said bushing being fitted within a suitable opening provided in the sheet metal supporting plate 52, and the same being peripherally welded or brazed along a continuous line, indicated at 51ª, to said plate 52, to render the connection therebetween oil-tight. A compression spring 53 wound as shown to provide a reduced lower end is interposed between member 49 and member 51, to bias member 49 downwardly.

Strung upon the upwardly projecting end of shaft 50 is a metal member or washer 54, which is adapted to rotatably bear against the upper surface of member 51. Also strung upon shaft 50 above member 54 is a gasket or washer 55 of "Neoprene," or a similar rubber-like material; washer 55 having a central opening the peripheral wall of which fits quite closely against, and is adapted to rotate with shaft 50. Shaft 50 is provided at a predetermined point spaced from its upper end with a drilled diametrical passage 50ª; and an operating member 56, preferably of molded insulating material, is recessed to slidably accommodate the upper end of shaft 50. Operating member 56 may be of any desired external contour; a preferred form thereof being best illustrated in Figs. 1 and 3. Member 56 is provided with a drilled opening (not shown) through which one arm portion 57ª of a U-shaped wire clip is adapted to extend, for penetration of the aforementioned diametrical passage 50ª in shaft 50. Arm portion 57ª, when assembled as shown in Fig. 6, is adapted to restrain operating member 56 against rotary or longitudinal movement with respect to shaft 50. Member 56 is provided at its extreme end surface and in one side thereof with communicating grooves to accommodate the other arm portion 57ᵇ (Fig. 6) and the connecting portion 57ᶜ (Figs. 1 and 3) of said clip; the end (not shown) of arm portion 57ᵇ preferably being bent inwardly at substantially a right angle to snap into a corresponding recess in member 56, to prevent accidental loosening or displacement of said retaining clip. The wire of which said clip is formed is preferably plated with nickel, chromium, or the like, to improve the appearance of operating member 56. Moreover member 56 is preferably molded from a phenolic condensation product plastic of black or other dark color, so that the exposed portions 57ᵇ and 57ᶜ additionally serve as an indicator for cooperation with the various legends applied to the name plates 58ª to 58ᶠ, respectively, attached to the supporting plates 52 associated with said selector switches. Name plates 58ª, etc. are attached to supporting plates 52, as by means of a pair of drive screws 59, 59 (see Fig. 1). The force applied by spring 53 acts to continuously compress the "Neoprene" washer or gasket 55, to effectively connect the operating member 56, the shaft 50 and the bushing 51 in an oil-tight relationship.

At the right-hand side of Fig. 6 I have shown a switch unit 35 having a mushroom head type of operating member 60 associated therewith. The supporting plate 61 associated with such a switch is provided with a circular opening to accommodate a hollow metal bushing 62 of the form illustrated; said bushing being attached to plate 61 in an oil-tight relationship, as by means of a peripherally continuous line of welding or brazing, as indicated at 63. The drawn or die formed sheet metal head 60 has spot welded or otherwise rigidly attached to its inner surface centrally thereof a shaft 64 of circular cross section. Shaft 64 is provided at its lower end with a tapped recess (not shown) to accommodate the threaded shank of a screw the large flat and smooth head of which is designated by numeral 65. A lockwasher 66 is preferably interposed between head 65 and shaft 64 to prevent accidental loosening of the screw. Screw head 65 may have its edge serrated or otherwise roughened to facilitate tightening thereof.

Interposed between supporting plate 61 and cover member 10 is the flange or gasket portion of a molded member composed of "Neoprene" or a similar oil-tight flexible rubber or rubber-like material; said flange being clamped in position by screws 31 like those aforedescribed. Formed integrally with flange 67ª is a substantially cylindrical depending portion 67ᵇ having an integral upwardly angled portion 67ᶜ and a centrally located flat portion 67ᵈ, which is thus interposed between the upper end of plunger 37 and the screw head 65. The mushroom head operator 60 may thus be utilized to effect operation of the associated switch mechanism without affecting the oil-tightness of the housing formed by the base and cover members of the control station.

As shown in Figs. 1 and 3, each mushroom head 60 may have a suitable legend (such as "Stop" or "Off") engraved or otherwise formed therein; the engraved letters preferably being filled with an enamel or the like of white or other suitable distinguishing color. Alternatively such a legend may be arranged in arcuate form adjacent the periphery of head 60, and repeated a number of times, say, three, so that the legend will be legible regardless of the rotary position in which head 60 may happen to be. If desired, of course, the legend as illustrated could be employed, and means provided to insure against rotation of shaft 64 relatively to the bushing 62 (right-hand side of Fig. 6).

Although I have used the numerals 10 and 11 to respectively designate the cover and base members in Figs. 1 and 2 and in Figs. 3 to 6; it is to be understood that the housing of Figs. 3 to 6 differs from that of Figs. 1 and 2 in respect of both length and width, and also in respect of the reduced caliber of the bushing $12^x$ (Figs. 3 and 4) as compared with the bushing 12 of Figs. 1 and 2. By reason of the smaller size of bushing $12^x$ (Fig. 4) it is not necessary to cut away one of the end walls or flange portions of cover member 10 (as at $10^b$ in Fig. 2). Similarly, only two cover-securing screws $15^x$ are required for the housing of Figs. 3 and 4, whereas four screws $15^x$ are employed in the larger station of Figs. 1 and 2. Moreover, two spacing studs 17 are associated with each sheet metal channel member or support 18; six being thus required in Figs. 1 and 2, and four being required in Figs. 3 and 4.

As shown in Fig. 3, if less than eight indicating light and/or switch units are positioned within the housing, each unused opening ($10^d$, Figs. 5 and 6) in the cover member 10 of the latter may have a blank plate 68 overlying the same and attached to the cover member; a gasket (not shown) like one of the gaskets 32 shown in Figs. 5 and 6 being interposed between each plate 68 and the outer face of cover member 10, and a pair of screws 31 being employed to clamp each plate 68 in oil-tight relationship to the cover member.

In Fig. 7 I have more or less diagrammatically illustrated a machine tool control station of the character herein contemplated adapted to accommodate or house a maximum of ten indicating light and/or switch units of the character aforedescribed; $10^x$ designating the sheet metal cover member of the housing, and the same being connected in an oil-tight relationship, in the manner aforedescribed, to a box-like sheet metal base member (not shown). Each circle 69 represents either the lens of a pilot light or the operating element of one of the several types of switch units aforedescribed. If one light or switch unit is omitted, a plate 68 will be employed to seal the particular opening in cover member $10^x$; as shown at the lower right-hand end of Fig. 7; a gasket (not shown) of "Neoprene" or the like being interposed between plate 68 and the outer face of cover member $10^x$ to maintain the oil-tightness of the housing or station as a whole.

Fig. 8 is a somewhat diagrammatic illustration of a machine tool control station or housing adapted to provide for oil-tight accommodation of a maximum of twelve indicating light and/or switch units; the cover member being designated by numeral $10^y$, and the light or switch units being represented by numeral 69. If only eleven units are required in the particular station a blank plate 68 may be attached in oil-tight relationship to cover member $10^y$, as shown at the lower right-hand corner of Fig. 8.

With reference to Fig. 3, it will be apparent that by use of two or more of the blank plates 68 a station having only six or less indicating light or switch units housed therein may be provided. By providing the other three sizes of housings (Figs. 7, 8 and 1) any other even or odd number of indicating light or switch units may be accommodated in oil-tight relationship within a single housing. The possibility of thus minimizing the required number of different sized housings to accommodate the ordinary maximum and minimum numbers of units required in machine tool control stations is of importance from the manufacturing and commercial viewpoints, as will be apparent to those skilled in the art.

Although, as shown in Figs. 1 and 2 and in Fig. 4, the end wall designated $11^x$ (to which the bushing 12 or the bushing $12^x$ is attached) is preferably separately formed of a metal sheet of substantially greater thickness than the other portions of the housing, to provide for substantially rigidly supporting the housing 10, 11 by the bushing 12 and conduit 20 (or by bushing $12^x$ and its associated wiring conduit, not shown); it is to be understood that by forming at least the base member 11 of the housing of relatively thicker sheet metal, such base member may consist of a single piece of sheet metal. Moreover, for a station of the relatively small size shown in Figs. 3 and 4, the base member 11 might well be of one-piece construction (thus eliminating the necessity for the separate end wall $11^x$, Fig. 4) while still affording a sufficiently rigid support of the complete housing, by the bushing $12^x$ and the conduit to be threaded thereinto.

I claim:

1. A sheet metal oil-tight station for electrical control elements comprising, in combination, an enclosure comprising a sheet metal base member of box-like form, a sheet metal cover member of box-like form, said members being adapted for assembly with the open ends thereof in telescopic relationship one to the other, a rubber-like sealing gasket extending entirely around and supported by the peripheral wall of one of said members and engaged by the edge portion of the peripheral wall of the other member to render the connection therebetween oil-tight, at least one electrical control element attached to and supported by said base member independently of said cover member while maintaining the oil-tightness of said base member, a corresponding number of operating members carried by said cover member and movable relative thereto, and rubber-like gasket means for each of said operating members attached to said cover member and completely segregating said operating members from the interior of said enclosure thereby sealing the latter against entrance of oil.

2. A sheet metal oil-tight station for electrical control elements comprising, in combination, an enclosure comprising a sheet metal base member of box-like form, a sheet metal cover member of box-like form, said members being adapted for assembly with the open ends thereof in telescopic relationship one to the other, a rubber-like sealing gasket extending entirely around and supported by the peripheral wall of one of said members and engaged by the edge portion of the peripheral wall of the other member to render the connection therebetween oil-tight, at least one electrical control element base mounted on said base independently of said cover member while maintaining the oil-tightness of said base member, a corresponding number of operating members carried by said cover member and movable relative thereto, and multi-hole mounting means for securing each of said operating members to said cover member in an oil-tight manner, said mounting means comprising a mounting plate having an opening therein through which a portion of said operating member extends means for securing said mounting plates to the exterior of said cover member, and rubber-like gasket means sealing the openings in said mounting means, thereby maintaining said enclosure oil-tight.

3. A sheet metal oil-tight station for electrical control elements comprising, in combination, an enclosure comprising a sheet metal base member of box-like form, a sheet metal cover member of box-like form, said members being adapted for assembly with the open ends thereof in telescopic relationship one to the other, said cover member having metal bars of substantially Z-form in cross section rigidly and permanently attached to the inner surface of each side and end wall thereof to provide an outwardly opening channel adjacent the open end of said cover member, a strip of rubber-like material forcibly inserted into said channel throughout the inner periphery of said cover member to form a gasket for engagement by the peripheral edge of said base member to afford an oil-tight connection between said members, means for removably holding the telescoped portions of said cover member and said base member in oil-tight relationship to each other and simultaneously to insure proper spacing and parallelism of said members while maintaining the oil-tightness of the enclosure, at least one electrical control element base mounted on said base member independently of said cover member, a corresponding number of operating members carried by said cover member and movable relative thereto, and multi-hole mounting means for securing each of said operating members to said cover member in an oil-tight manner, said mounting means comprising a mounting plate having an opening therein through which a portion of said operating member extends, means for securing said mounting plates to the exterior of said cover member, and rubber-like gasket means sealing the openings in said mounting means, thereby maintaining said enclosure oil-tight.

4. A sheet metal oil-tight station for electrical control elements comprising, in combination, an enclosure comprising a sheet metal base member of box-like form, a sheet metal cover member of box-like form, said members being adapted for assembly with the open ends thereof in telescopic relationship one to the other, said cover member having metal bars of substantially Z-form in cross section rigidly and permanently attached to the inner surface of each side and end wall thereof to provide an outwardly opening channel adjacent the open end of said cover member, a strip of rubber-like material forcibly inserted into said channel throughout the inner periphery of said cover member to form a gasket for engagement by the peripheral edge of said base member to afford an oil-tight connection between said members, means for removably holding the telescoped portions of said cover member and said base member in oil tight relationship to each other and simultaneously to insure proper spacing and parallelism of said members while maintaining the oil-tightness of the enclosure, said means comprising a plurality of studs rigidly and permanently attached to the bottom wall of said base member, said studs having threaded recesses formed in the upper ends thereof and circular countersinks surrounding said recesses, rubber-like washers positioned in said countersinks, and a corresponding number of screws penetrating said cover member and taking into said recesses to secure said cover member to said base member, at least one electrical control element base mounted on said base member independently of said cover member, a corresponding number of operating members carried by said cover member and movable relative thereto, and multi-hole mounting means for securing each of said operating members to said cover member in an oil-tight manner, said mounting means comprising a mounting plate having an opening therein through which a portion of said operating member extends, means for securing said mounting plates to the exterior of said cover member, and rubber-like gasket means sealing the openings in said mounting means, thereby maintaining said enclosure oil-tight.

5. A sheet metal oil-tight enclosure for electrical control elements comprising, in combination, a sheet metal base member of box-like form, a sheet metal cover member of box-like form, said members being adapted for assembly with the open ends thereof in telescopic relationship one to the other, a rubber-like sealing gasket extending entirely around and supported by the peripheral wall of one of said members and engaged by the edge portion of the peripheral wall of the other member to render the connection therebetween oil-tight, means for removably holding the telescoped portions of said cover member and said base member in oil-tight relationship to each other and simultaneously to insure proper spacing and parallelism of said members without affecting the oil-tightness thereof, a plurality of relatively thick sheet metal strips extending in parallel relationship across the inner surface of the bottom wall of said base member and welded thereto, at least one sheet metal supporting plate overlying said strips for base mounting of the control elements thereon, and means for removably attaching said plates to said strips, said means comprising a plurality of long headed studs the shanks of which penetrate the plates and take into tapped openings in said strips, and the upper ends of said studs being jointly engageable by the inner surface of the top wall of said cover member to insure proper spacing and parallelism of the latter with respect to the bottom wall of said base member.

6. A sheet metal oil-tight enclosure for electrical control elements comprising, in combination, a sheet metal base member of box-like form, a sheet metal cover member of box-like form, said members being adapted for assembly with the open ends thereof in telescopic relationship one to the other, a rubber-like sealing gasket extending entirely around and supported by the peripheral wall of one of said members and engaged by the edge portion of the other member to render the connection therebetween oil-tight, and means providing for alternative mountings of said enclosure to suitable supporting structure without affecting the oil-tightness of the enclosure, said means comprising a bushing rigidly and permanently attached in oil-tight relationship to one end of said base member and adapted for threaded engagement by one end of an oil-tight metal wiring conduit for support of the enclosure thereby, a plurality of metal foot members having perforated lugs extending laterally substantially beyond the peripheral wall of said base member, and a plurality of internally recessed and tapped metal members having an oil-tight welded connection with the inner surface of the bottom wall of said base member and in alinement with openings therein, said tapped recesses being adapted to accommodate the shanks of securing screws to alternatively provide for attachment of said enclosure to a panel or similar support or to provide for angularly displaceable attachment of said metal foot members to said base member, the latter having angularly related pairs of grooves formed therein, and said foot members having extruded bosses formed thereon for selective cooperation with one groove of each pair, whereby said lugs may be extended beyond either a side wall or an end wall of said base member for attaching said enclosure to suitable supporting structure.

7. A sheet metal oil-tight station for electrical control elements comprising, in combination, an enclosure comprising a sheet metal base member of box-like form, a sheet metal cover member of box-like form, said members being adapted for assembly with the open ends thereof in telescopic relationship one to the other, a rubber-like sealing gasket extending entirely around and supported by the peripheral wall of one of said members and engaged by the edge portion of the peripheral wall of the other member to render the connection therebetween oil-tight, at least one electrical control element base mounted on said base member independently of said cover member while maintaining the oil-tightness of said base member, a corresponding number of operating members carried by said cover member and movable relative thereto, multi-hole mounting means for securing each of said operating members to said cover member in an oil-tight manner, said mounting means comprising a mounting plate having an opening therein through which a portion of said operating member extends, means for securing said mounting plates to the exterior of said cover member, and rubber-like gasket means sealing the openings in said mounting means, thereby maintaining said enclosure oil-tight, and means providing for alternative mountings of said enclosure to suitable supporting structure without affecting the oil-tightness of the enclosure, said means comprising a bushing rigidly and permanently attached in oil-tight relationship to one end of said base member and adapted for threaded engagement by one end of an oil-tight metal wiring conduit for support of the enclosure thereby, a plurality of metal foot members having perforated lugs extending laterally substantially beyond the peripheral wall of said base member, and a plurality of internally recessed and tapped metal members having an oil-tight welded connection with the inner surface of the bottom wall of said base member and in alinement with openings therein, said tapped recesses being adapted to accommodate the shanks of securing screws to alternatively provide for attachment of said enclosure to a panel or similar support or to provide for angularly displaceable attachment of said metal foot members to said base member, the latter having angularly related pairs of grooves formed therein, and said foot members having extruded bosses formed thereon for selective cooperation with one groove of each pair, whereby said lugs may be extended beyond either a side wall or an end wall of said base member for attaching said enclosure to suitable supporting structure.

8. A sheet metal oil-tight station for electrical control elements comprising, in combination, an enclosure comprising a sheet metal base member of box-like form, a sheet metal cover member of box-like form, said members being adapted for assembly with the open ends thereof in telescopic relationship one to the other, said cover member having metal bars of substantially Z-form in cross section rigidly and permanently attached to the inner surface of each side and end wall thereof to provide an outwardly opening channel adjacent the open end of said cover member, a strip of rubber-like material forcibly inserted into said channel throughout the inner periphery of said cover member to form a gasket for engagement by the peripheral edge of said base member to afford an oil-tight connection between said members, means for removably holding the telescoped portions of said cover member and said base member in oil-tight relationship to each other and simultaneously to insure proper spacing and parallelism of said members while maintaining the oil-tightness of the enclosure, at least one electrical control element base mounted on said base member independently of said cover member, a corresponding number of operating members carried by said cover member and movable relative thereto, multi-hole mounting means for securing each of said operating members to said cover member in an oil-tight manner, said mounting means comprising a mounting plate having an opening therein through which a portion of said operating member extends, means for securing said mounting plates to the exterior of said cover member, and rubber-like gasket means sealing the openings in said mounting means, thereby maintaining said enclosure oil-tight, and means providing for alternative mountings of said enclosure to suitable supporting structure without affecting the oil-tightness of the enclosure, said means comprising a bushing rigidly and permanently attached in oil-tight relationship to one end of said base member and adapted for threaded engagement by one end of an oil-tight metal wiring conduit for support of the enclosure thereby, a plurality of metal foot members having perforated lugs extending laterally substantially beyond the peripheral wall of said base member, and a plurality of internally recessed and tapped metal members having an oil-tight welded connection with the inner surface of the bottom wall of said base member and in alinement with openings therein, said tapped recesses being adapted to accommodate the shanks of securing screws to alternatively provide for attachment of said enclosure to a panel or similar support or to provide for angularly displaceable attachment of said metal foot members to said base member, the latter having angularly related pairs of grooves formed therein, and said foot members having extruded bosses formed thereon for selective cooperation with one groove of each pair, whereby said lugs may be extended beyond either a side wall or an end wall of said base member for attaching said enclosure to suitable supporting structure.

9. A sheet metal oil-tight enclosure for electrical control elements comprising, in combination, a sheet metal base member of box-like form, a sheet metal cover member of box-like form, said members being adapted for assembly with the open ends thereof in telescopic relationship one to the other, a rubber-like sealing gasket extending entirely around and supported by the peripheral wall of one of said members and engaged by the edge portion of the peripheral wall of the other member to render the connection therebetween oil-tight, means for removably holding the telescoped portions of said cover member and said base member in oil-tight relationship to each other and simultaneously to insure proper spacing and parallelism of said members without affecting the oil-tightness thereof, a plurality of relatively thick sheet metal strips extending in parallel relationship across the inner surface of the bottom wall of said base member and welded thereto, at least one sheet metal supporting plate overlying said strips for base mounting of the control elements thereon, means for removably attaching said plates to said strips, said means comprising a plurality of long headed studs the shanks of which penetrate the plates and take into tapped openings in said strips, and the upper ends of said studs being jointly engageable by the inner surface of the top wall of said cover member to insure proper spacing and parallelism of the latter with respect to the bottom wall of said base member, and means providing for alternative mountings of said enclosure to suitable supporting structure without affecting the oil-tightness of the enclosure, said means comprising a bushing rigidly and permanently attached in oil-tight relationship to one end of said base member and adapted for threaded engagement by one end of an oil-tight metal wiring conduit for support of the enclosure thereby, a plurality of metal foot members having perforated lugs extending laterally substantially beyond the peripheral wall of said base member, and a plurality of internally recessed and tapped metal members having an oil-tight welded connection with the inner surface of the bottom wall of said base member and in alinement with openings therein, said tapped recesses being adapted to accommodate the shanks of securing screws to alternatively provide for attachment of said enclosure to a panel or similar support or to provide for angularly displaceable attachment of said metal foot members to said base member, the latter having angularly related pairs of grooves formed therein, and said foot members having extruded bosses formed thereon for selective cooperation with one groove of each pair, whereby said lugs may be extended beyond either a side wall or an end wall of said base member for attaching said enclosure to suitable supporting structure.

10. A sheet metal oil-tight station for electrical control elements comprising, in combination, a sheet metal base member of box-like form, a sheet metal cover member of box-like form, said members being adapted for assembly with the open ends thereof in telescopic relation one to the other, a rubber-like sealing gasket extending entirely around and supported by the peripheral wall of one of said members and engaged by the edge portion of the peripheral wall of the other member to render the connection therebetween oil-tight, means for removably holding the telescoped portions of said cover member and said base member in oil-tight relationship to each other and simultaneously to insure proper spacing and parallelism of said members without affecting the oil-tightness thereof, a plurality of relatively thick sheet metal strips extending in parallel relationship across the inner surface of the bottom wall of said base member and welded thereto, at least one metal supporting plate overlying said strips, means for removably attaching said plate to said strips, said means comprising a plurality of long headed studs the shanks of which penetrate the plates and take into tapped openings in said strips, and the upper ends of said studs being jointly engageable by the inner surface of the top wall of said cover member to insure proper spacing and parallelism of the latter with respect to the bottom wall of said base member, at least one electrical control element base mounted on said plate independently of said cover member, a corresponding number of operating members carried by said cover member and movable relative thereto, multi-hole mounting means for securing each of said operating members to said cover member in an oil-tight manner, said mounting means comprising a mounting plate having an opening therein through which a portion of said operating member extends, means for securing said mounting plates to the exterior of said cover member, and rubber-like gasket means sealing the openings in said mounting means thereby maintaining said enclosure oil-tight, and means providing for alternative mountings of said enclosure to suitable supporting structure without affecting the oil-tightness of the enclosure, said means comprising a bushing rigidly and permanently attached in oil-tight relationship to one end of said base member and adapted for threaded engagement by one end of an oil-tight metal wiring conduit for support of the enclosure thereby, a plurality of metal foot members having perforated lugs extending laterally substantially beyond the peripheral wall of said base member, and a plurality of internally recessed and tapped metal members having an oil-tight welded connection with the inner surface of the bottom wall of said base member and in alinement with openings therein, said tapped recesses being adapted to accommodate the shanks of securing screws to alternatively provide for attachment of said enclosure to a panel or similar support or to provide for angularly displaceable attachment of said metal foot members to said base member, the latter having angularly related pairs of grooves formed therein, and said foot members having extruded bosses formed thereon for selective cooperation with one groove of each pair, whereby said lugs may be extended beyond either a side wall or an end wall of said base member for attaching said enclosure to suitable supporting structure.

CLYDE F. ROBBINS.

REFERENCES CITED

The following references are of record in the file of this patent:

UNITED STATES PATENTS

| Number | Name | Date |
|---|---|---|
| 796,360 | Rusby | Aug. 1, 1905 |
| 1,039,139 | Joleen | Sept. 24, 1912 |
| 1,796,521 | Hoaley | Mar. 17, 1931 |
| 1,829,214 | Driest | Oct. 27, 1931 |
| 1,851,930 | Baxter | Mar. 29, 1932 |
| 1,994,509 | Frank | Mar. 19, 1935 |
| 2,145,154 | Corbett | Jan. 24, 1939 |
| 2,271,972 | Engel et al. | Feb. 3, 1942 |
| 2,344,441 | Lorenz | Mar. 14, 1944 |
| 2,362,304 | Reed | Nov. 7, 1944 |
| 2,423,757 | Dedge | July 8, 1947 |

FOREIGN PATENTS

| Number | Country | Date |
|---|---|---|
| 179,771 | Great Britain | May 18, 1922 |

Certificate of Correction

Patent No. 2,526,901                                                 October 24, 1950

CLYDE F. ROBBINS

It is hereby certified that error appears in the printed specification of the above numbered patent requiring correction as follows:

Column 2, line 27, for the words "and indicating" read *an indicating*; line 54, strike out "with" second occurrence; column 3, line 39, for "line" read *lines*; column 5, line 6, for "tapered" read *tapped*; column 6, line 29, for "insulting" read *insulating*; line 42, after "said" insert *plate*; line 61, for "taped" read *tapped*; column 7, line 18, for "certian" read *certain*; column 10, line 59, for "opertaing" read *operating*; column 11, line 13, after "extends" insert a comma; column 16, line 70, list of references cited, after the name "Reed" insert *et al.*;

and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*